United States Patent [19]

Tan

[11] 4,435,804
[45] Mar. 6, 1984

[54] SUB-SIGNAL TRANSMITTING SYSTEM

[75] Inventor: Yoichi Tan, Kanagawa, Japan

[73] Assignee: Fuji Xerox Co., Ltd., Tokyo, Japan

[21] Appl. No.: 357,449

[22] Filed: Mar. 12, 1982

[30] Foreign Application Priority Data

Mar. 13, 1981 [JP] Japan .................................. 56-35243

[51] Int. Cl.³ .............................................. H04J 1/14
[52] U.S. Cl. .................... 370/69.1; 370/76; 370/94
[58] Field of Search ................. 370/76, 94, 110.1, 50, 370/85, 69.1, 60

[56] References Cited

U.S. PATENT DOCUMENTS 3,701,851 10/1972 Starrett ................................. 370/76
3,718,767 2/1973 Ellis ....................................... 370/76
4,332,027 5/1982 Malcolm et al. ..................... 370/85

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A data transmitting system where transmission in packet form takes place between several stations includes an encoder converting signals into a transmission waveform where the low frequency components are significantly attenuated. A sub-signal, notably a voice signal from a telephone set is multiplied on the low frequency region and also transmitted between the stations.

7 Claims, 2 Drawing Figures

SUB-SIGNAL TRANSMITTING SYSTEM

BACKGROUND OF THE INVENTION

This invention relates to a system for transmitting a signal in packet form, in which a signal is required to be transmitted while maintaining real-time correspondence between transmission and reception.

With the spread of computers and the development of processing techniques for digital signals, much attention has been directed to data communications for processing information by on-line operation, in the combination of communication systems and data processing systems. Specifically, in small scale communication systems such as for private communication within a premises such as government or municipal offices, companies, etc. a communication system in packet form utilizing communication cables such as coaxial cable has attracted public attention because of its high economic efficiency, reliability and transmission efficiency.

According to such a communication system, communication cables for bi-directional transmission are installed in the building or the like and a number of stations (personal stations) are connected with the cables. A message is divided into data blocks, each including 1000~2000 bits at the maximum, and is transmitted from each station. A header such as an address and serial number is added to the message. In this communication system, the network constitutes a passive transmission medium with no control function therein, as all of the required control functions are completely distributed to the respective personal stations. Therefore, each station begins to transmit a message after confirming a vacancy in the transmission path, and if the packet sent from a certain station should collide with another packet from other station, transmission of the packets are stopped at both stations. Those stations having transmission of the packets therefrom stopped try again to transmit the messages after the lapse of a random waiting period.

In the communication system as mentioned above, it is possible for users at the respective locations not only to gain access to the same computer, but also to commonly utilize hardware such as the memory and software (programs), which are distributed to the respective locations. In other words, devices including high speed or high accuracy printers and files with large capacity that were centralized on the central large scale computer and operated with the aid of a TSS (time sharing system) can be distributed to the respective locations and hence utilized in a distributed manner. Accordingly, such a communication system leads to a saving of resources and an improvement in working efficiency, as well as permits the development of large scale software systems due to the versatility of the programs and data. Furthermore, there is no use priority of transmission paths among the respective users (personal stations), such that they stand on an equal basis in the communication system. As a result, no hierarchy with main-slave relations among the stations is produced as often experienced in other communication systems, so that it becomes possible to communicate between any two stations which have been connected to each other. In addition, since the transmission paths are comprised of coaxial cables or similar completely passive circuits, a high reliability system can be made with ease.

As stated above, the foregoing communication system has various advantageous features, but, at the same time, is accompanied by a problem in that it is not suitable for the transmission of a signal whose transmission quality is greatly influenced unless the maintenance of real-time correspondence between transmission and reception is achieved. More specifically, the above-described communication system is disadvantageous in that a delay time is necessarily caused in the transmission process because data transmission in packet form is carried out utilizing a vacant time in the transmission path, and further because the delay time may vary greatly due to a collision between packets. This disadvantageous tendency naturally becomes more significant with increasing working efficiency or usage of the transmission paths of the system.

Therefore, voice communications have not generally been carried out by use of packet-form transmission systems up to now. If used, the application of such systems has been limited to uni-directional communications such as an answerphone or a dictation system in which only the content of a memory is transmitted. In other words, for the purpose of performing conversational voice communications, it has been required to abandon data transmission in packet form and the various advantages thereof, or provide a separate transmission path exclusively for voice communications.

SUMMARY OF THE INVENTION

This invention has been accomplished in view of the foregoing situation in the prior art; and an object of the present invention is to provide a signal transmitting system which enables the transmission of a signal where the real time correspondence between transmission and reception is of importance. According to this invention, the above object is achieved by a sub-signal transmitting system in which a signal to be transmitted in the form of a packet (referred to hereinafter as a main signal) is significantly attenuated by an encoder at low frequency components of the power spectrum thereof, and a signal whose transmission should be made while maintaining real time correspondence between transmission and reception (referred to hereinafter as a sub-signal) is multiplied on the thus attenuated low frequency region by a method of frequency division, and then transmitted.

DETAILED DESCRIPTION OF THE PREFERRED EMBODIMENTS

Figure 1:
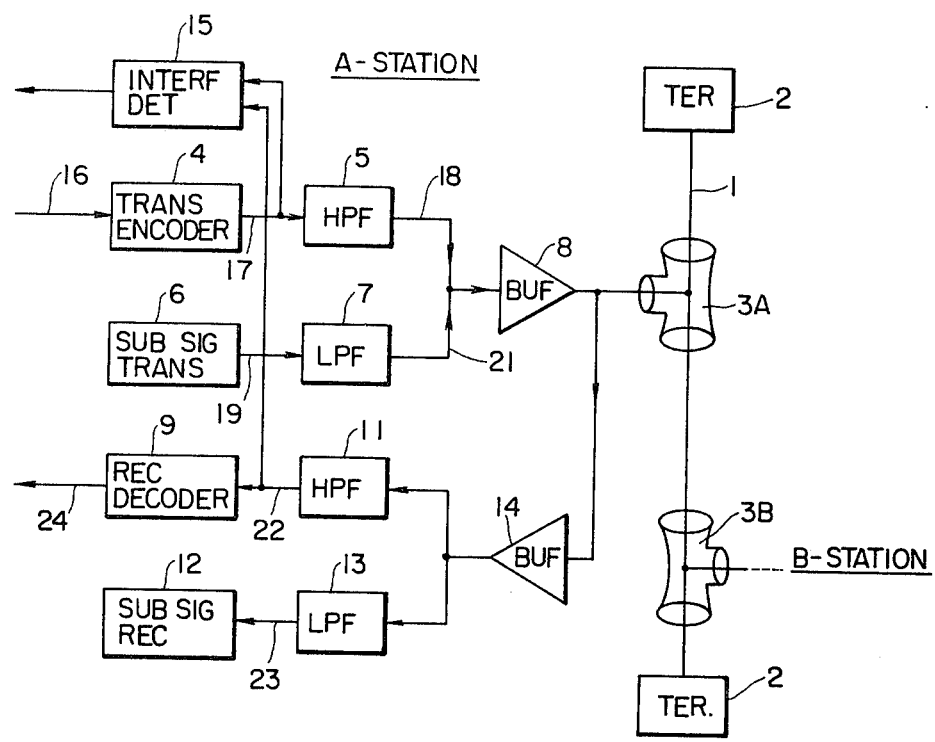
FIG. 1 is a schematic block diagram of a communication system according to one embodiment of this invention.

FIG. 1 is a schematic block diagram of a communication system employing the transmission system according to this invention. In this communication system, a coaxial cable 1 serving as a transmission path is connected to terminators 2 for impedance matching at both ends thereof. The respective stations are connected to the coaxial cable 1 through T-connectors 3A, 3B . . . etc. Each of these stations comprises a transmitting section including a transmitting encoder 4, a high-pass filter 5, a sub-signal transmitter 6, a low-pass filter 7 and a buffer amplifier 8; and a receiving section including a receiving decoder 9, a high-pass filter 11, a sub-signal receiver 12, a low-pass filter 13 and a buffer amplifier 14. An interference processing section includes an interference detector 15 and a random number generator (not shown). Associated utilization devices such as a computer and auxiliary memories (not shown) are connected to both transmitting and receiving sections, respectively.

In the thus arranged communication system, a main signal 16 output from the utilization devices of the station being connected to the coaxial cable 1 through the T-connector 3A (hereinafter referred to as station A) is supplied to the transmitting encoder 4 after having been converted into packet form. The transmitting encoder 4 converts the main signal into a transmission waveform having a power spectrum with significantly attenuated low frequency components. Although various kinds of encoders are available for use as the encoder 4, herein used is a transmitting encoder which converts the main signal into the Manchester Code, as a typical example.

Figure 2:
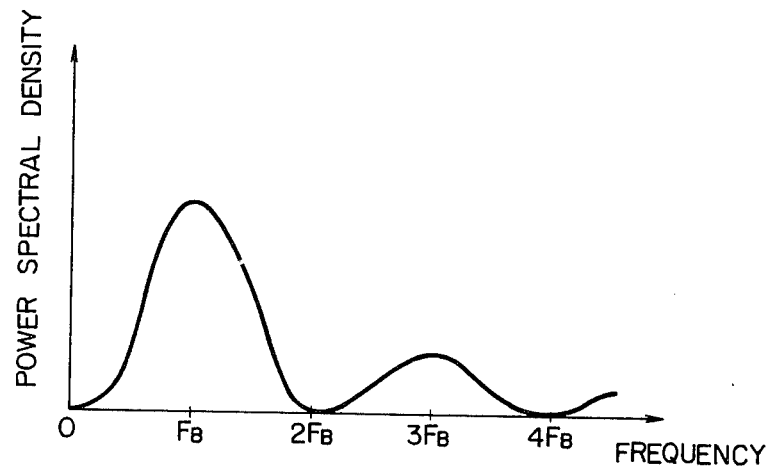
FIG. 2 is a graph illustrating the frequency characteristic of the spectral power density in the case where the main signal is converted into the Manchester Code, in the embodiment of FIG. 1.

FIG. 2 shows the frequency characteristic of the power spectrum density on the transmission medium in terms of the main signal which has been converted into the Manchester Code. As seen from this drawing, components of the main signal are rapidly attenuated in a lower frequency region (near DC). In the drawing, units $F_B$ on the absissa represent the clock frequency of the main signal. This clock frequency is normally set at several MHz, for example.

The high-pass filter 5 cuts off the sufficiently attenuated low frequency component of the encoded main signal 17 which is output from the transmitting encoder 4. Thereafter, the main signal 18 is supplied to the transmitting buffer amplifier 18.

On the other hand, a sub-signal (voice signal) 19 output from the sub-signal transmitter 6 such as a telephone transmitter is supplied to the transmitting low-pass filter 7 which passes at least the low frequency band 0.3–4 kHz. Thus, the unnecessary high frequency component is removed from the sub-signal 21, and the resulting sub-signal is supplied to the transmitting buffer amplifier 8 comprising a so-called linear amplifier which has a linear input/output characteristic. Then, the sub-signal 21 is combined with the main signal and transmitted to the coaxial cable 1.

Meanwhile, main signals and sub-signals sent out at a different time from a station connected to the T-connector 3B (hereinafter referred to as station B), for example, are transmitted to other respective stations through the coaxial cable 1. Among them, the main signal and sub-signal coming through the T-connector 3A of station A to the receiving buffer amplifier 14 (a linear amplifier) are supplied to both receiving high-pass and low-pass filters 11, 13 and separated into a main signal 22 and a sub-signal 23. Thereafter, the main signal 22 is fed to the receiving decoder 9 in which the encoded signal is returned to its original state as a main signal 24. The main signal 24 is supplied to the utilization devices of station A.

Moreover, the encoded main signal 22 is also fed together with the main signal 17 of the transmitting section to the interference detector 15, which checks to determine whether or not a collision has occurred between the packets. When such a collision occurs, the transmitting section in station A stops its transmission of the main signal. At this time, random numbers are generated from the random number generator (not shown) and the transmission of the main signal is again started after the lapse of a random waiting period in accordance with the random number generated. Similar control is also performed in the transmitting section of station B. In this connection, it is a matter of course that a bit pattern may be added to the head of each packet to indicate the priority of respective data and hence the transmission of the main signal using the packet with the higher priority is exclusively continued if the packets collide with each other.

On the other hand, the separated sub-signal 23 is supplied to the sub-signal receiver 12 such as a telephone receiver. Since the sub-signal 23 is not interrupted in its transmission even if there occurs a collision between the packets, it is obvious that normal conversation can be carried out without difficulties utilizing telephone sets, for example.

The selection of the cut-off frequencies at the respective filters 5, 7, 11 and 13 becomes the first important issue in the sub-signal transmitting system as described above. These cut-off frequencies should be selected so as to give the proper level distribution between the main signal and the sub-signal as well as to minimize the degree of deterioration in transmission quality of both signals. It will be sufficiently confirmed from the following facts that such selection is possible in practice: (1) in wire communication systems of this type, the transmission devices for the main signal are AC-coupled (coupled through a transformer) to separate the grounds of both station and cable from each other, and hence the low frequency component near DC has been cut off heretofore, and (2) the low frequency component of the power spectrum of the main signal according to this invention has a shape such as typically illustrated in FIG. 2.

Secondly, there is a problem regarding how to transmit a control signal when performing intercommunication calls through a private branch-exchange by use of the present sub-signal transmitting system. Although the control signal can be sent as a sub-signal in theory, it becomes necessary to make the normal telephone network independent of the system arrangement and hence additional facilities are required to be installed, thus leading generally to a disadvantage in economy. The control signal is not subject to a very severe correspondence relation between both transmitting and receiving sides, so that it is preferable to transmit in the packet form from the viewpoint of reducing the number of additional circuits.

More specifically, for the normal use of telephone sets, only the control signal is included in a packet for the main signal and then transmitted, so as to allow controls such as the ringing of the telephone bell at the called station, and the issuance a busy tone to indicate the trunk busy for all telephone receivers at stations other than one addressed. When the called person picks up the telephone receiver, transmission of the sub-signal as described above is begun through the telephone transmitter and receiver.

Although the most simple use of the coaxial cable 1 is to employ it as an exclusive line, it is also possible to add a general calling or paging function through a loudspeaker by utilizing a loudspeaker telephone set, or to provide the telephone sets with a function permitting meeting or conference calls therethrough. Furthermore, reduction of the busy rate with an increased number of telephone channels becomes possible by carrying the control signal in a packet for the main signal. In other words, known voice multiplying/separating devices of the frequency division type may be employed to serve as the sub-signal transmitter 6 and receiver 12, and an exchange control function for such devices may be carried out using the main signal. The possibility of practical applications of the foregoing system will be understood in view of the fact that a normal telephone line comprises not only a transmission path for the voice signal but also a transmission path for control signals.

In the above, the transmission of the sub-signal has been explained by way of the use of telephone sets. However, low speed data transmission, which is another mode of communication with telephone sets, can be also realized with ease by utilizing the present sub-signal transmission path. More specifically, in the prior art, it has been required for low speed data terminals to be provided with a function such as to divide data into predetermined blocks and then convert into packets having headers added, when such terminals are connected to the packet transmission line. However, the present sub-signal transmitting system does not require the addition of such a function.

As fully described hereinbefore, according to the invention, the sub-signal is transmitted in frequency divided manner by utilizing a low frequency region of the power spectrum of the main signal, thus enabling the construction of a useful system with less expense, while fully employing the advantageous features of data transmission in packet form.

In addition, although a sub-signal transmitting system using a coaxial cable has been described in the foregoing embodiment, the invention is not so limited. Similar transmission modes can of course be realized by the use of paired cables, for example.

What is claimed is:

1. A data transmission system wherein data is transmitted in packet form between multiple stations, comprising:
    main signal transmitting means for a main signal to be transmitted in the form of a packet, said main signal being directed along a transmission path including an encoder, said encoder converting said main signal into a transmission waveform having a power spectrum with significantly attenuated low frequency components;
    sub-signal transmitting means for a sub-signal to be transmitted, said sub-signal being independent of said main signal and being in the low frequency region of said encoder;
    means for superimposing said main signal and sub-signal and transmitting the combined signals.

2. A transmission system as claimed in claim 1, wherein a voice signal from a telephone set is transmitted as said sub-signal, while a control signal for exchange and connection of telephone sets is transmitted as said main signal in packet form.

3. A transmission system as claimed in claim 1, said main signal transmitting means including said encoder, said high-pass filter means for cutting off an attenuated low frequency component, and said combining and transmitting means including buffer amplifier means.

4. A transmission system as claimed in claim 3, further comprising a utilization device within a station for producing said main signal being received by said main signal transmitting means.

5. A transmission system as claimed in claim 3, said sub-signal transmission means including transmission means and low-pass filter means connected to said buffer amplifier means.

6. A transmission system as claimed in claims 1, 2 and 3, further comprising interference detector means for detecting whether a packet transmitted via said system has collided with a packet received by the system, and for controlling re-transmission of said data in that event.

7. A transmission system as claimed in claim 1, further comprising receiver means for said main and sub-signals, including filter means for sorting said signals, and decoder means for said main signal.

* * * * *